United States Patent
Kondo et al.

(10) Patent No.: US 8,655,181 B2
(45) Date of Patent: Feb. 18, 2014

(54) OPTICAL TRANSMISSION/RECEPTION MODULE

(75) Inventors: Akihiro Kondo, Tokyo (JP); Nobuo Ohata, Tokyo (JP); Masatoshi Katayama, Tokyo (JP); Kenji Ogata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 151 days.

(21) Appl. No.: 13/203,761

(22) PCT Filed: Jun. 1, 2009

(86) PCT No.: PCT/JP2009/002435
§ 371 (c)(1),
(2), (4) Date: Aug. 29, 2011

(87) PCT Pub. No.: WO2010/140186
PCT Pub. Date: Dec. 9, 2010

(65) Prior Publication Data
US 2011/0311229 A1    Dec. 22, 2011

(51) Int. Cl.
*H04B 10/02* (2011.01)
*H04B 10/24* (2011.01)

(52) U.S. Cl.
USPC ............. 398/138; 398/42; 398/135; 398/139

(58) Field of Classification Search
USPC ...................... 398/41, 42, 135–139
See application file for complete search history.

(56) References Cited

U.S. PATENT DOCUMENTS

| | | |
|---|---|---|
| 6,021,238 A | 2/2000 | Spaeth |
| 6,142,680 A * | 11/2000 | Kikuchi et al. ................. 385/93 |
| 2005/0180755 A1 * | 8/2005 | Masahiko ..................... 398/135 |
| 2006/0140547 A1 * | 6/2006 | Park et al. ........................ 385/89 |
| 2006/0239623 A1 * | 10/2006 | Yoon ................................. 385/93 |
| 2007/0122154 A1 * | 5/2007 | Nakanishi et al. .............. 398/85 |
| 2007/0297809 A1 | 12/2007 | Okada et al. |
| 2008/0193088 A1 * | 8/2008 | Pfnuer ............................ 385/92 |
| 2009/0003833 A1 * | 1/2009 | Chung et al. .................. 398/136 |

FOREIGN PATENT DOCUMENTS

| | | |
|---|---|---|
| JP | 10 111439 | 4/1998 |
| JP | 2000 258643 | 9/2000 |
| JP | 2003 524789 | 8/2003 |
| JP | 2003 270496 | 9/2003 |
| JP | 2003 322770 | 11/2003 |
| JP | 2006 285087 | 10/2006 |
| JP | 2006 351608 | 12/2006 |
| JP | 2008 34807 | 2/2008 |
| JP | 2009 015298 | 1/2009 |

OTHER PUBLICATIONS

International Search Report issued Jun. 30, 2009 in PCT/JP09/002435 filed Jun. 1, 2009.

* cited by examiner

*Primary Examiner* — Daniel Dobson
(74) *Attorney, Agent, or Firm* — Oblon, Spivak, McClelland, Maier & Neustadt, L.L.P.

(57) ABSTRACT

An optical transmission/reception module including a filter holder on which filter mount surfaces for mounting wavelength division multiplexing filters and light wavelength band limiting filters are formed and in which a hole for guiding a light signal is formed in each of the filter mount surfaces incorporated into a housing. The wavelength division multiplexing filters and the light wavelength band limiting filters are mounted to the filter mount surfaces formed on the filter holder, respectively.

6 Claims, 7 Drawing Sheets

OPTICAL TRANSMISSION/RECEPTION MODULE

FIELD OF THE INVENTION

The present invention relates to an optical transmission/reception module mounted in a subscriber optical network terminating device (ONU: Optical Network Unit) which constructs a GEPON system (Gigabit Ethernet Passive Optical Network System/Ethernet is a registered trademark (this description will be omitted hereafter)) which is an optical subscriber access network system for providing Internet services with a maximum transmission rate of 1 gigabit/second, or 2.5 gigabits/second for subscribers in an optical subscriber system, such as FTTB (Fiber To The Building), in an FTTH (Fiber To The Home), or the like.

BACKGROUND OF THE INVENTION

A GEPON system is comprised of a station optical line terminating device (OLT: Optical Line Terminal) disposed in a center station, an optical divider for dividing a transmission line into up to 32 lines, and subscriber optical network terminating devices each disposed in a member's house.

In the GEPON system, a wavelength of 1,310 nm is assigned to an uplink digital data signal which is transmitted from each subscriber optical network terminating device to the station optical line terminating device, a wavelength of 1,490 nm is assigned to a downlink digital data signal (including a digital sound signal) transmitted from the station optical line terminating device to each subscriber optical network terminating device, and a wavelength of 1,550 nm is assigned to a downlink video signal (including an analog video signal).

Furthermore, it has been examined conventionally with an eye towards future technological innovation that in the GEPON system, a wavelength band of 1,565 nm or longer is assigned as the wavelengths of digital data signals which are transmitted at a transmission rate of 10 gigabits/second. Furthermore, the wavelength band of 1,565 nm or longer is used also as a light wavelength band for examining a disconnection of a line optical fiber connected between the station optical line terminating device and each subscriber optical network terminating device.

Thus, in the GEPON system, a wavelength division multiplexing method (WDM: Wavelength Division Multiplexing) of assigning a plurality of wavelengths is used to carry out single-core bidirectional optical communications via which an uplink wavelength and a downlink wavelength are transmitted by using a single optical fiber.

However, in the GEPON system, it is necessary to provide a light wavelength band limiting filter for interference prevention for the purpose that each subscriber optical network terminating device does not cause interference (cross talk) between the wavelength of the downlink digital data signal and the wavelength of the downlink video signal.

More specifically, the optical transmission/reception module mounted in each subscriber optical network terminating device needs to include a light wavelength band limiting filter for interference prevention.

Typically, the light wavelength band limiting ability of the light wavelength band limiting filter greatly depends on the light incidence angle to the filter.

More specifically, when the number of components having different light incidence angles increases, the light wavelength band limiting filter exhibits a combined light wavelength band limiting ability according to the components having different light incidence angles.

Particularly, in a case in which the wavelength interval between received wavelength bands is narrow, while a light signal having a wavelength band which is desired originally to pass through the filter is blocked, a wavelength band which is desired to be blocked is allowed to pass through the filter. The light wavelength band limiting filter thus cannot sufficiently exhibit its light wavelength band limiting ability.

Therefore, a light wavelength band limiting filter having a high required ability to prevent interference (cross talk) of an optical reception signal is used in a collimating optical system which can reduce light incidence angle components in many cases, but is used rarely in a diffusing optical system. However, the collimating optical system has a complicated structure, as will be mentioned below.

The angle of incidence of light to a light wavelength band limiting filter depends on a displacement caused by an installation angle with respect to an optical fiber a displacement caused by an installation angle with respect to a wavelength division multiplexing filter (WDMF: Wavelength Division Multiplexing Filter), a displacement caused by an installation angle of the light wavelength band limiting filter itself, etc.

Because it is impossible to measure the angle of incidence of light to the light wavelength band limiting filter, it is necessary to design the optical transmission/reception module in consideration of the amount of angular displacement within the limits of design assurance in the structural design.

Although in a GEPON system an optical transmission/reception module mounted in a subscriber optical network terminating device needs to include a light wavelength band limiting filter for interference prevention, as mentioned above, an optical transmission/reception module disclosed by patent reference 1 mentioned below carries out demultiplexing and multiplexing of light signals having a plurality of wavelengths by using a wavelength division multiplexing filter to implement single-core bidirectional optical communications.

However, because a lens coupling optical element is only connected between the wavelength division multiplexing filter and the optical fiber in this optical transmission/reception module, the optical transmission/reception module cannot be applied to a GEPON system in which a light wavelength exists adjacent to each of the light wavelength of a downlink digital data signal and the light wavelength of a signal for video image.

In order to maintain the light wavelength band limiting ability of a light wavelength band limiting filter to prevent interference (cross talk) of an optical reception signal, collimating optical equipment or the like in which the inside of an optical transmission/reception module is replaced by a collimating optical system (collimate optical system) is disposed and the light wavelength band limiting filter is used in the collimating optical system. As a result, the light wavelength band limiting filter can exhibit the light wavelength band ability.

A problem with the collimating optical system is, however, that the component count increases and the collimating optical system has a complicated structure.

Furthermore, in a diffusing optical system, if the angle of incidence of light to a light wavelength band limiting filter can be managed with a high degree of accuracy, the light wavelength band limiting ability of the light wavelength band limiting filter can be improved.

However, in order to adjust the angle of incidence of light, an advanced alignment technique is required.

RELATED ART DOCUMENT

Patent Reference

Patent reference 1: Japanese Unexamined Patent Application Publication (Translation of PCT Application) No. 2003-524789

SUMMARY OF THE INVENTION

Because conventional optical transmission/reception modules are constructed as mentioned above, it is easy to ensure that the light wavelength band limiting filter exhibits an adequate light wavelength band limiting ability by disposing collimating optical equipment and applying a collimating optical system. A problem is, however, that the component count increases and the structure becomes complicated.

In contrast, although the use of a diffusing optical system can improve the light wavelength band limiting ability if the angle of incidence of light to the light wavelength band limiting filter can be managed with a high degree of accuracy, a problem is that in order to adjust the angle of incidence of light, an advanced alignment technique is required.

The present invention is made in order to solve the above-mentioned problems, and it is therefore an object of the present invention to provide an optical transmission/reception module which can ensure a desired light wavelength band limiting ability without using a complicated collimating optical system, and without using an advanced alignment technique for a diffusing optical system.

In accordance with the present invention, there is provided an optical transmission/reception module in which a filter holder on which mount surfaces for mounting a wavelength division multiplexing filter and a light wavelength band limiting filter are formed and in which a hole for guiding a light signal is formed in each of the mount surfaces is incorporated into a housing, and the wavelength division multiplexing filter and the light wavelength band limiting filter are mounted to the mount surfaces formed on the above-mentioned filter holder, respectively.

Because the optical transmission/reception module in accordance with the present invention is constructed in such a way that the filter holder on which the mount surfaces for mounting the wavelength division multiplexing filter and the light wavelength band limiting filter are formed and in which a hole for guiding a light signal is formed in each of the mount surfaces is incorporated into the housing, and the wavelength division multiplexing filter and the light wavelength band limiting filter are mounted to the mount surfaces formed on the above-mentioned filter holder, respectively, the relative positions among the filters are determined with a high degree of accuracy, and, as a result, there is provided an advantage of being able to ensure a desired light wavelength band limiting ability without using a complicated collimating optical system, and without using an advanced alignment technique for a diffusing optical system.

EMBODIMENTS OF THE INVENTION

Hereafter, in order to explain this invention in greater detail, the preferred embodiments of the present invention will be described with reference to the accompanying drawings.

Embodiment 1.

Figure 1:
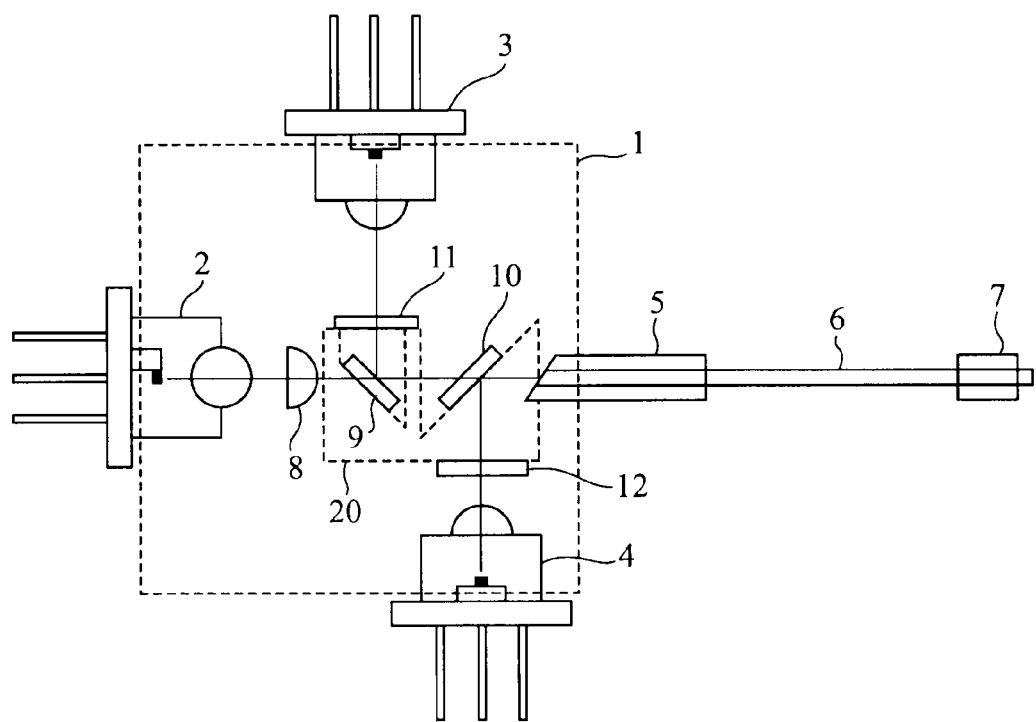
FIG. 1 is a block diagram showing an optical transmission/reception module in accordance with Embodiment 1 of the present invention.

FIG. 1 is a block diagram showing an optical transmission/reception module in accordance with Embodiment 1 of the present invention. The optical transmission/reception module shown in FIG. 1 is installed in a subscriber optical network terminating device.

As shown in FIG. 1, in a housing 1, an optical transmission module 2, optical reception modules 3 and 4, and so on which are structural components of the optical transmission/reception module are installed by means of adhesion, welding, or the like, and a filter holder 20 (refer to FIGS. 2 and 3) is incorporated.

The optical transmission module 2 converts an electric signal which is an uplink digital data signal into a light signal having a wavelength band of 1,310 nm, and outputs the light signal to a condensing lens 8.

The condensing lens 8 is a member for focusing the light signal outputted from the optical transmission module 2, and outputting the light signal to a wavelength division multiplexing filter 9.

The optical reception module 3 receives a light signal passing through a light wavelength band limiting filter 11 (a light signal having a wavelength band of 1,490 nm which is a downlink digital data signal), among light signals reflected by the wavelength division multiplexing filter 9, and converts the light signal into an electric signal.

The optical reception module 4 receives a light signal passing through a light wavelength band limiting filter 12 (a light signal having a wavelength band of 1,550 nm which is a downlink video signal), among light signals reflected by a wavelength division multiplexing filter 10, and converts the light signal into an electric signal.

In FIG. 1, although the example in which the light signal transmitted by the optical transmission module 2 has a wavelength band of 1,310 nm, the light signal received by the optical reception module 3 has a wavelength band of 1,490 nm and the light signal received by the optical reception module 4 has a wavelength band of 1,550 nm is shown, this is only an example, and it is needless to say that each light signal having such a certain wavelength band as above can be replaced by a light signal having another wavelength band.

A fiber ferrule 5 has an end surface which is cut slantwise (for example, the end surface of the fiber ferrule 5 is cut slantwise at an angle of about 8 degrees), and is secured to the housing in such a way that the ferrule is located adjacent to the wavelength division multiplexing filter 10 on a right side in the figure of the wavelength division multiplexing filter.

An optical fiber 6 has an end which is connected to a connector 7, and another end which is connected to the fiber ferrule 5, and is an optical transmission line for transmitting the light signal having a wavelength band of 1,310 nm passing through the wavelength division multiplexing filter 10 and outputting the light signal toward the connector 7, and also transmitting the light signal having a wavelength band of 1,490 nm incident thereon from the connector 7 (a light signal transmitted from a station optical line terminating device) and the light signal having a wavelength band of 1,550 nm (a light signal transmitted from the station optical line terminating device), and outputting the light signals toward the wavelength division multiplexing filter 10.

The connector 7 is a connecting member to which the end of the optical fiber 6 is connected, and to which an end of a single mode fiber is connected. Another end of the single mode fiber is connected to the station optical line terminating device.

The wavelength division multiplexing filter 9 allows the light signal having a wavelength band of 1,310 nm transmitted from the optical transmission module 2 to pass therethrough toward the wavelength division multiplexing filter 10 while reflecting the light signal having a wavelength band of 1,490 nm passing through the wavelength division multiplexing filter 10 toward the optical reception module 3.

The wavelength division multiplexing filter 10 allows the light signal having a wavelength band of 1,310 nm passing through the wavelength division multiplexing filter 9 to pass therethrough toward the end surface of the fiber ferrule 5 and also allows the light signal having a wavelength band of 1,490 nm emitted from the end surface of the fiber ferrule 5 to pass therethrough toward the wavelength division multiplexing filter 9 while reflecting the light signal having a wavelength band of 1,550 nm emitted from the end surface of the fiber ferrule 5 toward the optical reception module 4.

The light wavelength band limiting filter 11 is arranged between the wavelength division multiplexing filter 9 and the optical reception module 3, and its passband is set to the wavelength band of 1,490 nm.

The light wavelength band limiting filter 12 is arranged between the wavelength division multiplexing filter 10 and the optical reception module 4, and its passband is set to the wavelength band of 1,550 nm.

Figure 2:
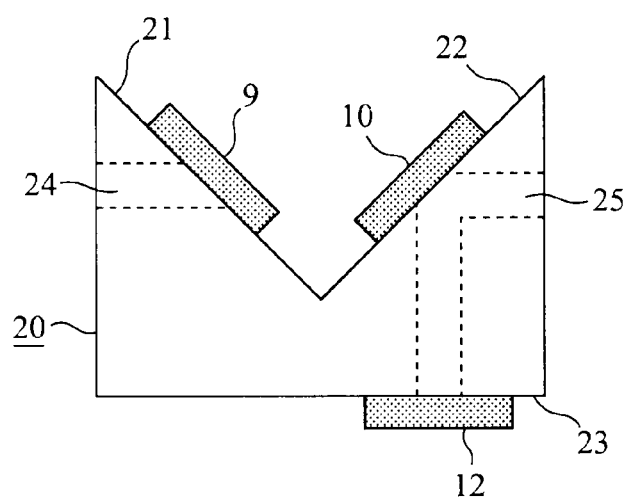
FIG. 2 is a block diagram showing a filter holder incorporated into a housing of the optical transmission/reception module in accordance with Embodiment 1 of the present invention.
Figure 3:
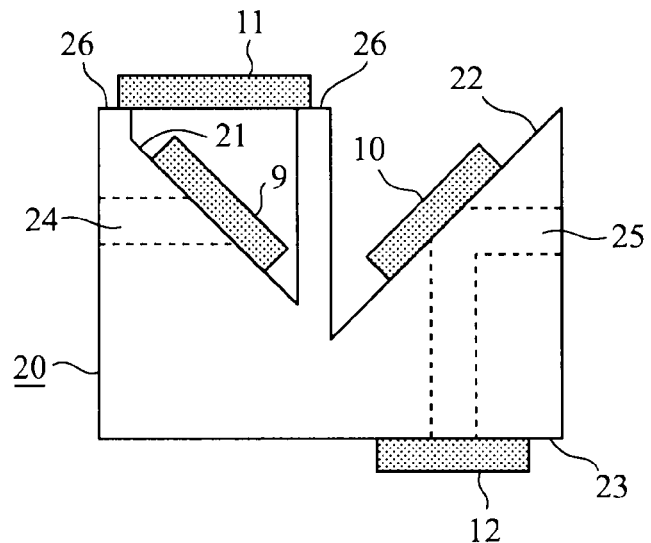
FIG. 3 is a block diagram showing a filter holder incorporated into the housing of the optical transmission/reception module in accordance with Embodiment 1 of the present invention.

A filter holder 20 is a member on which mount surfaces for mounting the wavelength division multiplexing filters 9 and 10 and the light wavelength band limiting filters 11 and 12 are formed (no mount surface for mounting the light wavelength band limiting filter 11 is formed in a filter holder 20 shown FIG. 2 while a mount surface for mounting he light wavelength band limiting filter 11 is also formed on the filter holder 20 of FIG. 3), and in which a hole for guiding a light signal is formed in each mount surface, and the filter holder 20 is incorporated into the housing 1.

FIG. 2 is a block diagram showing the filter holder 20 incorporated into the housing 1 of the optical transmission/reception module in accordance with Embodiment 1 of the present invention.

In FIG. 2, a filter mount surface 21 is the one to which the wavelength division multiplexing filter 9 is mounted. A filter mount surface 22 is the one to which the wavelength division multiplexing filter 10 is mounted.

A filter mount surface 23 is the mount surface to which the light wavelength band limiting filter 12 is mounted.

An optical path 24 is a hole which is formed in order to guide the light signal having a wavelength band of 1,310 nm transmitted from the optical transmission module 2 to the filter mount surface 21 to which the wavelength division multiplexing filter 9 is mounted.

An optical path 25 is a hole which is formed in order to guide the light signal having a wavelength band of 1,490 nm and the light signal having a wavelength band of 1,550 nm which are emitted from the end surface of the fiber ferrule 5 to the filter mount surface 22 to which the wavelength division multiplexing filter 10 is mounted while guiding the light signal having a wavelength band of 1,550 nm reflected by the wavelength division multiplexing filter 10 to the filter mount surface 23 to which the light wavelength band limiting filter 12 is mounted.

The optical path 25 is also a hole for guiding the light signal having a wavelength band of 1,310 nm passing through the wavelength division multiplexing filter 10 to the end surface of the fiber ferrule 5.

However, because the filter holder 20 of FIG. 2 is intended for mounting the three filters, the light wavelength band limiting filter 11 cannot be mounted to this filter holder.

Therefore, because it is necessary to secure the light wavelength band limiting filter 11 to the housing 1 or the optical reception module 3 by means of adhesion, welding, or the like in order to install the light wavelength band limiting filter 11, the filter holder 20 of FIG. 2 is hardly suitable for an optical transmission/reception module in which the light wavelength band limiting filter 11 needs to be installed (the filter holder 20 of FIG. 2 is suitable for an optical transmission/reception module in which the light wavelength band limiting filter 11 does not have to be installed).

In contrast with this, because the filter holder 20 shown in FIG. 3 is intended for mounting the four filters and the light wavelength band limiting filter 11 can also be mounted to the filter holder, the filter holder is suitable for an optical transmission/reception module in which the light wavelength band limiting filter 11 needs to be installed.

In FIG. 3, a filter mount surface 26 is the one to which the light wavelength band limiting filter 11 is mounted.

Hereafter, a method of incorporating the filter holder 20 into the housing 1 will be explained.

Figure 4:
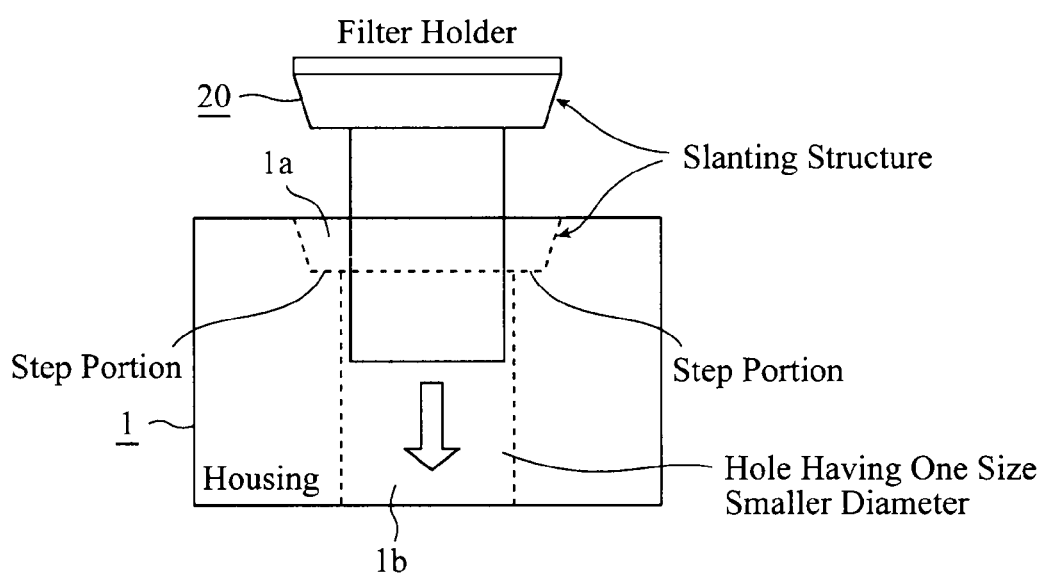
FIG. 4 is an explanatory drawing showing a method for incorporating the filter holder into the housing.
Figure 5:
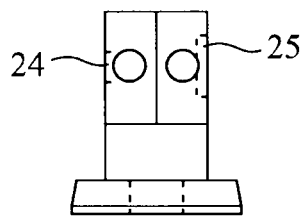
FIG. 5 is an explanatory drawing showing the filter holder which is viewed from directly above.
Figure 5:
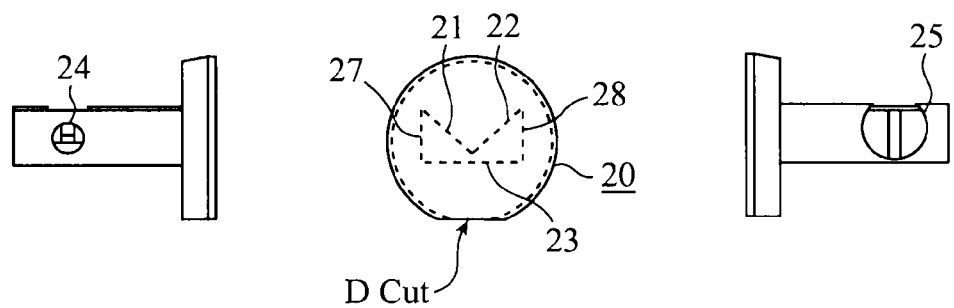
Figure 5:
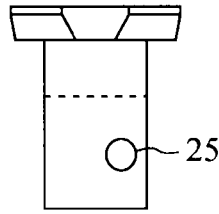

FIG. 4 is an explanatory drawing showing the method of incorporating the filter holder 20 into the housing 1, and FIG. 5 is an explanatory drawing showing the filter holder 20 which is viewed from directly above.

In FIG. 5, a surface 27 is an end portion of the optical path 24 formed in the filter holder 20.

A surface 28 has a hole formed therein into which the fiber ferrule 5 is inserted, and is an end portion of the optical path 25.

First, a cylindrical hole 1a is formed in one surface of the housing 1 (in the example of FIG. 4, an upper surface of the housing 1), and a hole 1b is also formed concentrically with respect to the hole 1a inside the housing 1 and having a diameter smaller than that of the hole 1a. As shown in FIG. 4, the hole 1a has a tapered portion whose diameter decreases toward its bottom side.

Because the two holes 1a and 1b having different diameters form a step portion inside the housing 1, the combination of the two holes 1a and 1b substantially resembles a bolt in shape.

Because the filter holder 20 is intended to be incorporated into the holes 1a and 1b formed in the housing 1 (in the example of FIG. 4, the filter holder 20 is press-fitted into the holes downward from the upper side of the housing 1), the filter holder 20 is shaped in such a way as to conform to the shape of the combination of the two holes 1a and 1b.

More specifically, the filter holder 20 has an upper portion shaped like a disc and having a slanting surface structure, and a lower portion shaped like a cylinder.

The press fitting of the filter holder 20 to the housing 1 is carried out until a bottom end of the disc-shaped portion which forms the upper portion of the filter holder 20 is brought into contact with the step portion disposed inside the housing 1.

More specifically, the bottom end of the disc-shaped portion which forms the upper portion of the filter holder 20 is stopped at the position where the bottom end is brought into contact with the step portion disposed inside the housing 1, so that the filter holder 20 is positioned.

Furthermore, in each of the disc-shaped upper portion of the filter holder 20 and the hole 1a formed in the housing 1, a D cut (a flat portion having the same width) is formed in a part on the circumference, as shown in FIG. 5.

Therefore, because the filter holder 20 and the housing 1 are positioned when the filter holder 20 is press-fitted into the housing 1 in such a way that both the D cuts are automatically aligned with each other, the filter holder 20 can be incorporated into the housing 1 with a high degree of accuracy.

Furthermore, because the tapered portion is formed in each of the disc-shaped upper portion of the filter holder 20 and the hole 1a formed in the housing 1, as mentioned above, the filter holder 20 is positioned with a high degree of accuracy when the filter holder 20 is press-fitted into the housing 1 in such a way that both the tapered portions are aligned with each other.

As can be seen from the above description, the optical transmission/reception module in accordance with this Embodiment 1 is constructed in such a way that the filter holder 20 on which the filter mount surfaces 21, 22, 26, and 23 for mounting the wavelength division multiplexing filters 9 and 10 and the light wavelength band limiting filters 11 and 12 are formed and in which the hole for guiding a light signal is formed in each of the filter mount surfaces is incorporated into the housing 1, and the wavelength division multiplexing filters 9 and 10 and the light wavelength band limiting filters 11 and 12 are mounted to the filter mount surfaces 21, 22, 26, and 23 formed on the filter holder 20, respectively, the relative positions among the filters are determined with a high degree of accuracy, and, as a result, there is provided an advantage of being able to ensure a desired light wavelength band limiting ability without using a complicated collimating optical system, and without using an advanced alignment technique for the diffusing optical system.

More specifically, because in the optical transmission/reception module in accordance with this Embodiment 1, all the filters closely associated with light signals transmitted via the optical fiber 6 are mounted to the single filter holder 20, the accuracy of each of the relative angles among the filters can be improved.

Furthermore, because the filter holder 20 is incorporated into the housing 1, by simply improving the position accuracy of the positional relationship between the single filter holder 20 and the housing 1, instead of improving the position accuracy of the positional relationship between each of the filters and the housing 1, the relative position among the filters is determined with a high degree of accuracy while the relative position of each of the filter with respect to the optical fiber is determined with a high degree of accuracy.

Although the example in which the D cut (a flat portion having the same width) is formed in a part on the circumference of each of the disc-shaped upper portion of the filter holder 20 and the hole 1a formed in the housing 1 is shown in this Embodiment 1, a notched portion, instead of the D cut, can be formed in a part on the circumference of the filter holder, and a projecting portion having the same shape as the notched portion can be disposed in the housing.

Also in this case, because the filter holder 20 and the housing 1 are positioned when the filter holder 20 is press-fitted into the housing 1 in such a way that the notched portion of the filter holder is automatically aligned with the projecting portion, the filter holder 20 can be incorporated into the housing 1 with a high degree of accuracy.

Figure 6:
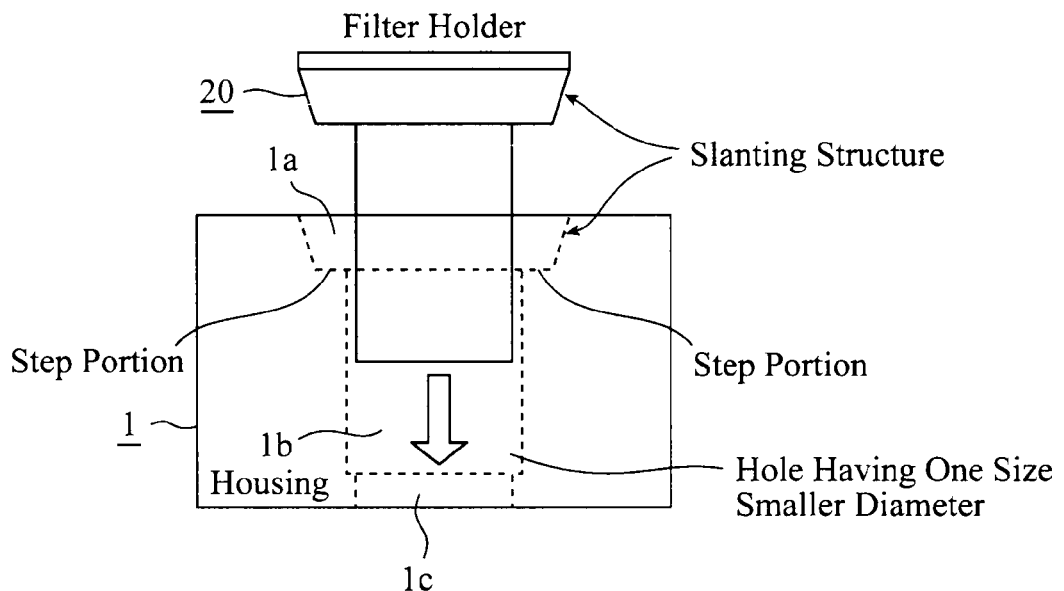
FIG. 6 is an explanatory drawing showing the method for incorporating the filter holder into the housing.

Furthermore, although the example in which the hole 1a is formed in the upper surface of the housing 1 and the hole 1b is formed inside the housing 1 is shown in this Embodiment 1, a hole 1c (a hole which is fitted into the cylindrical lower portion of the filter holder 20) can also be formed in the lower surface of the housing 1, as shown in FIG. 6, and, when the filter holder 20 is press-fitted into the housing 1, the cylindrical lower portion of the filter holder 20 is fitted into the hole 1c formed in the lower surface of the housing 1.

In this case, the axis of the filter holder 20 can be prevented from being inclined.

Figure 7:
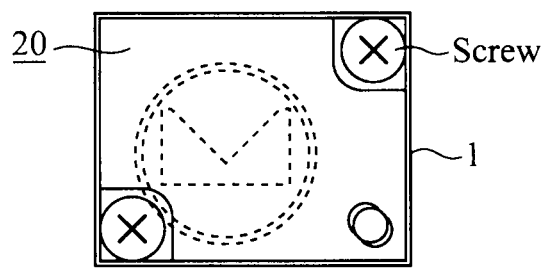
FIG. 7 is an explanatory drawing showing how to screw the filter holder into the housing.
Figure 7:
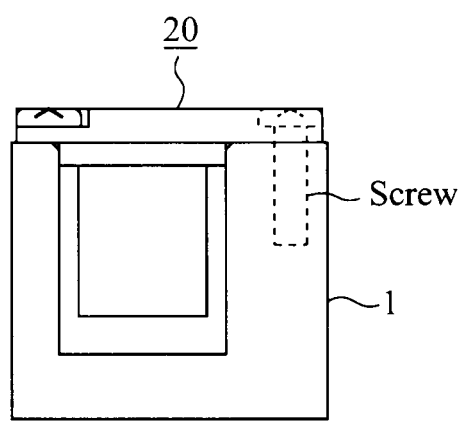

Furthermore, although the example in which the filter holder 20 is incorporated into the housing 1 by press-fitting the filter holder 20 into the housing 1 is shown in this Embodiment 1, the filter holder 20 can be screwed to the housing 1 after the filter holder 20 is positioned with respect to the housing 1, as shown in FIG. 7.

Figure 8:
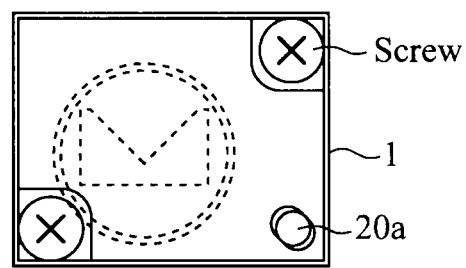
FIG. 8 is an explanatory drawing showing fixation of the filter holder by using an anti-rotation pin disposed in the housing.
Figure 8:
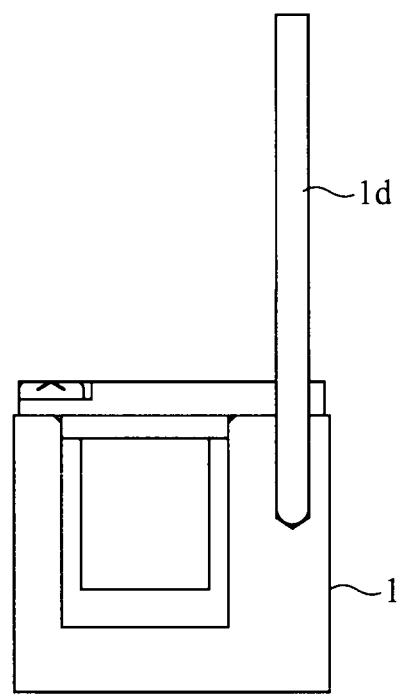

Furthermore, in order to enable high-accuracy positioning of the filter holder 20 with respect to the housing 1 at this time, an anti-rotation pin 1d can be disposed in the housing 1 and the filter holder 20 can be secured with the anti-rotation pin 1d (the anti-rotation pin 1d is passed through a hole 20a formed in the filter holder 20) when the filter holder 20 is incorporated into the housing 1, as shown in FIG. 8.

Although the example in which the wavelength division multiplexing filters 9 and 10 and the light wavelength band limiting filters 11 and 12 are respectively mounted to the filter mount surfaces 21, 22, 26, and 23 of the filter holder 20 is shown in this Embodiment 1, there is a case in which when too much adhesive is used to mount the wavelength division multiplexing filters 9 and 10 and the light wavelength band limiting filters 11 and 12 to the filter mount surfaces 21, 22, 26, and 23, respectively, excessive adhesive blocks the optical paths 24 and 25 or some of filters are out of contact with the corresponding mount surfaces.

Figure 9:
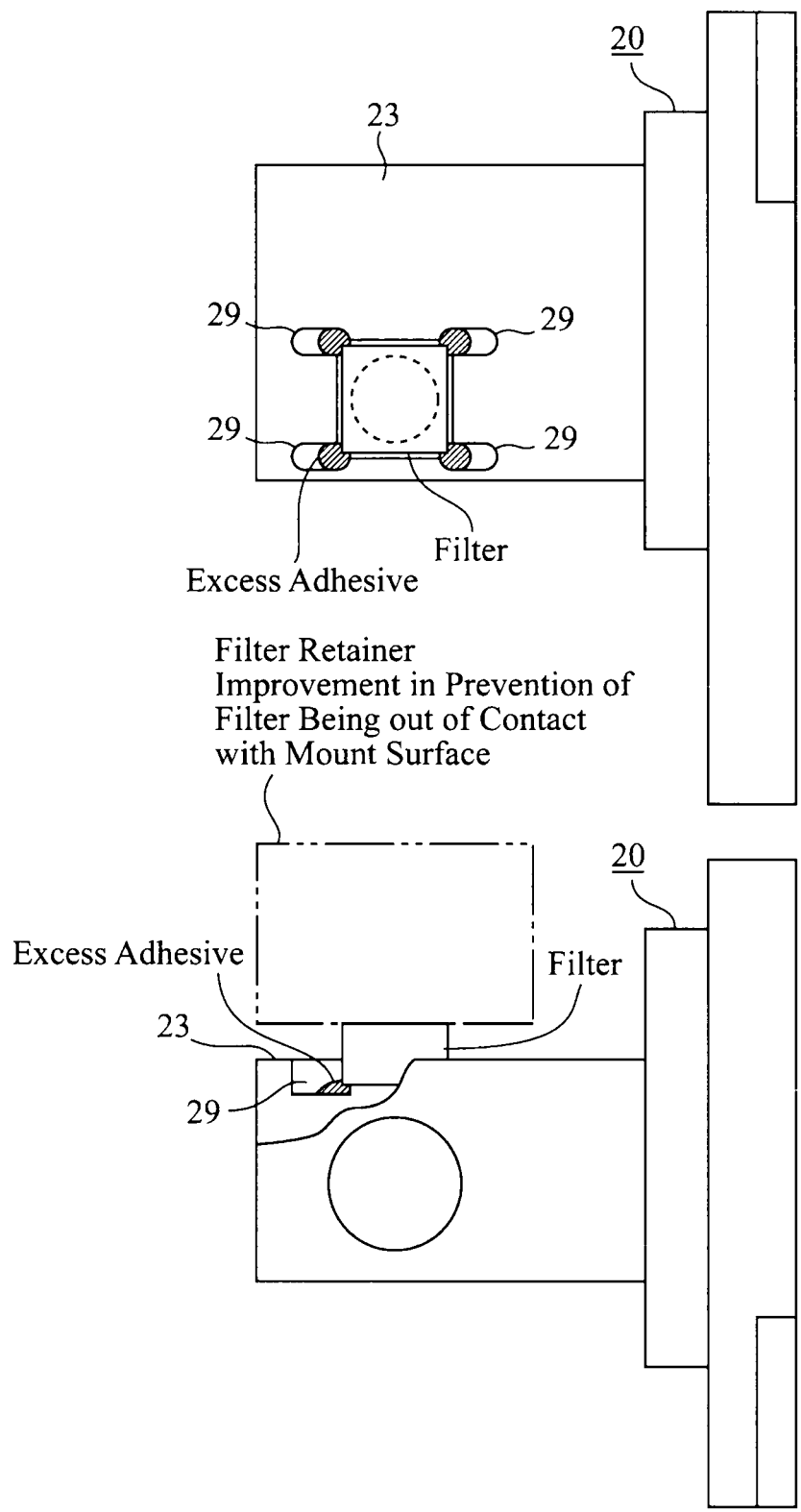
FIG. 9 is an explanatory drawing showing a filter mount surface in which a clearance is disposed.

To solve this problem, a clearance 29 can be formed in each of the filter mount surfaces 21, 22, 26, and 23 of the filter holder 20 so that may excessive adhesive flows into the clearance 29, as shown in FIG. 9.

By making excessive adhesive flow into the clearance 29, a uniform adhesive thickness can be acquired.

Although the example in which one optical transmission module and two optical reception modules are installed in the housing 1 is shown in this Embodiment 1, two or more optical transmission modules and three or more optical reception modules can be installed in the housing 1.

In the case in which two or more optical transmission modules and three or more optical reception modules are installed in the housing 1, three or more units are installed in the housing 1 as wavelength division multiplexing filters and three or more units are installed in the housing 1 as light wavelength band limiting filters.

Although the example in which the single filter holder 20 is incorporated into the housing 1 is shown in this Embodiment 1, the number of filters also increases in proportion to increase in the number of optical transmission modules and increase in the number of optical reception modules.

In this case, by connecting a plurality of filter holders 20 and incorporating these filter holders into the housing 1 as a single piece, the same advantages as those provided by this Embodiment 1 can be offered.

Embodiment 2

Figure 10:
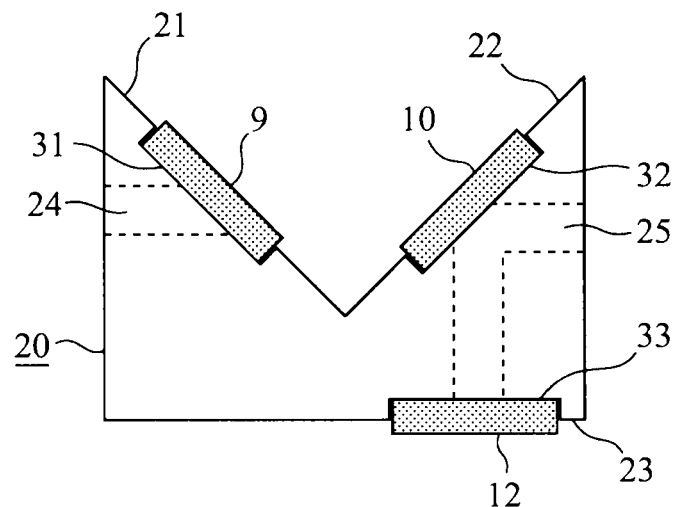
FIG. 10 is a block diagram showing a filter holder incorporated into a housing of an optical transmission/reception module in accordance with Embodiment 2 of the present invention.
Figure 11:
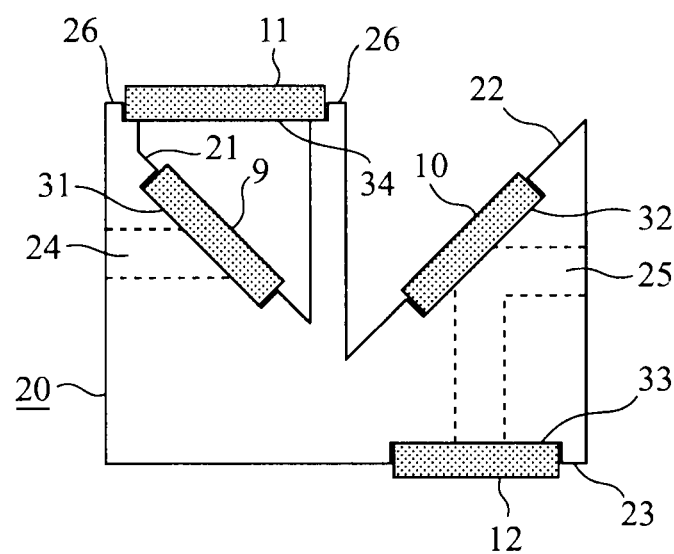
FIG. 11 is a block diagram showing a filter holder incorporated into the housing of the optical transmission/reception module in accordance with Embodiment 2 of the present invention.

FIGS. 10 and 11 are block diagrams each showing a filter holder 20 incorporated into a housing 1 of an optical transmission/reception module in accordance with Embodiment 2 of the present invention. In the figures, because the same reference numerals as those shown in FIGS. 2 and 3 denote the same components or like components, the explanation of the components will be omitted hereafter.

The filter holder 20 of FIG. 10 is the one furnished with three filters while the filter holder 20 of FIG. 11 is the one furnished with four filters.

At least one side of a recessed portion 31 has the same width as a wavelength division multiplexing filter 9, and the recessed portion is formed in a filter mount surface 21 of the filter holder 20 to which the wavelength division multiplexing filter 9 is mounted.

At least one side of a recessed portion 32 has the same width as a wavelength division multiplexing filter 10, and the recessed portion is formed in a filter mount surface 22 of the filter holder 20 to which the wavelength division multiplexing filter 10 is mounted.

At least one side of a recessed portion 33 has the same width as a light wavelength band limiting filter 12, and the recessed portion is formed in a filter mount surface 23 of the filter holder 20 to which the light wavelength band limiting filter 12 is mounted.

At least one side of a recessed portion 34 has the same width as a light wavelength band limiting filter 11, and the recessed portion is formed in a filter mount surface 26 of the filter holder 20 to which the light wavelength band limiting filter 11 is mounted.

Although the example in which the wavelength division multiplexing filters 9 and 10 and the light wavelength band limiting filters 11 and 12 are respectively mounted to the filter mount surfaces 21, 22, 26, and 23 of the filter holder 20 is shown in above-mentioned Embodiment 1, the recessed portions 31, 32, 34, and 33 each whose at least one side has the same width as the corresponding one of the wavelength division multiplexing filters 9 and 10 and the light wavelength band limiting filters 11 and 12 can be formed in the filter mount surfaces 21, 22, 26, and 23 of the filter holder 20, respectively, as shown in FIGS. 10 and 11.

Because the positioning of the wavelength division multiplexing filters 9 and 10 to the filter mount surfaces 21, 22, 26, and 23 and the light wavelength band limiting filters 11 and 12 has a high degree of accuracy by forming the recessed portions 31, 32, 34, and 33 in the filter mount surfaces 21, 22, 26, and 23 of the filter holder 20, respectively, the relative positions among the filters are determined with a higher degree of accuracy. As a result, there is provided an advantage of being able to ensure a desired light wavelength band limiting ability without using a complicated collimating optical system, and without using an advanced alignment technique for the diffusing optical system.

Furthermore, because the positions where the wavelength division multiplexing filters 9 and 10 and the light wavelength band limiting filters 11 and 12 are respectively mounted to the housing 1 become accurate by forming the recessed portions 31, 32, 34, and 33 in the filter mount surfaces 21, 22, 26, and 23 of the filter holder 20, respectively, the ease of assembly can be improved and the optical transmission/reception module can be provided at a low cost.

Although the example in which the recessed portions 31, 32, 34, and 33 are respectively formed in the filter mount surfaces 21, 22, 26, and 23 of the filter holder 20 is shown in this Embodiment 2, protruding portions each whose at least one side has the same width as the corresponding one of the wavelength division multiplexing filters 9 and 10 and the light wavelength band limiting filters 11 and 12 can be formed in the filter mount surfaces 21, 22, 26, and 23 of the filter holder 20, respectively, instead of the recessed portions 31, 32, 34, and 33.

INDUSTRIAL APPLICABILITY

The optical transmission/reception module in accordance with present invention is suitable for use as an optical transmission/reception module which needs to ensure a desired light wavelength band limiting ability when mounted in a subscriber optical network terminating device.

The invention claimed is:

1. An optical transmission/reception module comprising:
an optical transmission module for transmitting a light signal having a first wavelength band;
a first optical reception module for receiving a light signal having a second wavelength band;
a second optical reception module for receiving a light signal having a third wavelength band;
a fiber ferrule connected to an optical fiber;
a first wavelength division multiplexing filter for allowing the light signal having the first wavelength band transmitted from said optical transmission module to pass therethrough toward an end surface of said fiber ferrule and also allowing a light signal having the second wavelength band emitted from the end surface of said fiber ferrule to pass therethrough while reflecting a light signal having the third wavelength band emitted from the end surface of said fiber ferrule toward said second optical reception module;
a second wavelength division multiplexing filter arranged between said first wavelength division multiplexing filter and said optical transmission module, for allowing the light signal having the first wavelength band transmitted from said optical transmission module to pass therethrough toward said first wavelength division multiplexing filter while reflecting the light signal having the second wavelength band passing through said first wavelength division multiplexing filter toward said first optical reception module; and
a light wavelength band limiting filter arranged between said first wavelength division multiplexing filter and said second optical reception module;
a housing for mounting said optical transmission module, said first and second optical reception modules, said fiber ferrule, said first and second wavelength division multiplexing filters, and said light wavelength band limiting filter, the housing defining a cylindrical hole; and;
a filter holder mounted in said housing, wherein said filter holder has a first mount surface to which said first wavelength division multiplexing filter is mounted, a second mount surface to which said second wavelength division multiplexing filter is mounted, and a third mount surface to which said light wavelength band limiting filter is mounted, said first and second mount surfaces intersecting each other at a predetermined angle in such a way that said first and second mount surfaces have a substantially V shape in cross section, said third mount surface being formed on a rear side of said filter holder opposite to a side on which said first mount surface forms a narrow angle with said second mount surface, and wherein said housing and said filter holder each exhibit a tapered portion tapered in the direction of the axis of the cylindrical hole, said tapered portions being positioned and shaped to engage one another in a press fitting relation when said filter holder is mounted in said cylindrical hole of said housing.

2. The optical transmission/reception module according to claim 1, wherein the filter holder has an optical path for guiding a light signal, where end portions of the optical path are disposed in each of said first, second, and third mount surfaces formed on said filter holder.

3. The optical transmission/reception module according to claim 1, wherein said filter holder and said housing exhibit corresponding shaped portions disposed for positioning said filter holder in said housing in a direction of rotation about the axis of said cylindrical hole.

4. The optical transmission/reception module according to claim 1, wherein each of the first, second, and third mount surfaces of said filter holder has a recessed portion or a protruding portion, where at least one side of said recessed portion or said protruding portion has a same width as said first wavelength division multiplexing filter, said second wavelength division multiplexing filter, or said light wavelength band limiting filter.

5. The optical transmission/reception module according to claim 1, wherein:

the cylindrical hole in the housing has an enlarged portion at one end of the cylindrical hole, and a step portion provided at a junction between the enlarged portion of the cylindrical hole and a remainder of the cylindrical hole, wherein the tapered portion of the cylindrical hole is provided at the enlarged portion of the cylindrical hole;

the filter holder has an enlarged portion at one end of the filter holder, and a step portion provided at a junction between the enlarged portion of the filter holder and a remainder of the filter holder, wherein the tapered portion of the filter holder is provided at the enlarged portion of the filter holder; and the step portion of the cylindrical hole and the step portion of the filter holder contact one another when the tapered portions engage one another in a press fitting relation, for positioning said filter holder in said housing in the direction of the axis of the cylindrical hole.

6. The optical transmission/reception module according to claim 5, wherein the cylindrical hole in the housing has a smaller diameter portion at an end of the cylindrical hole opposite said one end of the cylindrical hole, and wherein said filter holder has a length sufficient that an end of the filter holder opposite said one end of the filter holder is fitted in the smaller diameter portion of the cylindrical hole.

* * * * *